United States Patent
Amou et al.

(10) Patent No.: US 8,507,592 B2
(45) Date of Patent: Aug. 13, 2013

(54) ADHESIVE COMPOSITION, ADHESIVE FILM AND WIRING FILM USING THE SAME

(75) Inventors: Satoru Amou, Hitachi (JP); Kosuke Kuwabara, Tokai (JP); Tomiya Abe, Hitachi (JP); Hiroaki Komatsu, Hitachi (JP); Kenichi Murakami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 13/308,591

(22) Filed: Dec. 1, 2011

(65) Prior Publication Data
US 2012/0138345 A1 Jun. 7, 2012

(30) Foreign Application Priority Data
Dec. 1, 2010 (JP) ................................. 2010-268006

(51) Int. Cl.
*C08K 5/34* (2006.01)
*B32B 19/00* (2006.01)

(52) U.S. Cl.
USPC .......................................... 524/105; 428/357

(58) Field of Classification Search
USPC ............................... 524/105; 428/355 R, 357
See application file for complete search history.

(56) References Cited

U.S. PATENT DOCUMENTS
2010/0317774 A1 * 12/2010 Sugioka .......................... 524/89

FOREIGN PATENT DOCUMENTS

| JP | 5-29399 | 2/1993 |
|---|---|---|
| JP | 2004-136631 | 5/2004 |
| JP | 2009-67934 | 4/2009 |
| JP | 2010-143988 | 7/2010 |
| JP | 2010-150437 | 7/2010 |

* cited by examiner

*Primary Examiner* — Kriellion Sanders
(74) *Attorney, Agent, or Firm* — Antonelli, Terry, Stout & Kraus, LLP.

(57) ABSTRACT

An adhesive composition includes a phenoxy resin having a bisphenol S skeleton in a structure and 10 to 100 parts by weight of a maleimide compound based on 100 parts by weight of the phenoxy resin. The maleimide compound has a plurality of maleimide groups in a structure and is at least one of a first maleimide compound having a melting temperature of 160° C. or lower and a gelling time at 200° C. of 180 to 350 seconds and a second maleimide compound having a melting temperature of 160° C. or lower and a gelling time at 250° C. of 110 to 150 seconds. A heat resistant adhesive film may be formed by coating the adhesive composition on a substrate film, and a wiring film may have a conductor wiring layer put between such heat resistant adhesive films.

18 Claims, 1 Drawing Sheet

ADHESIVE COMPOSITION, ADHESIVE FILM AND WIRING FILM USING THE SAME

CLAIM OF PRIORITY

The present application claims priority from Japanese patent application serial no. 2010-268006 filed on Dec. 1, 2010, the content of which is hereby incorporated by reference into this application.

FIELD OF THE INVENTION

The present invention concerns a thermosetting adhesive composition, and an adhesive film and a wiring film using the adhesive composition.

BACKGROUND OF THE INVENTION

In recent years, electronic equipment has been decreased in size, thickness, and weight and there has been a demand for wiring boards having refined wirings at high density by multilayering, refinement of wirings, and reduced thickness to be used for such electronic devices. Further, with an aim of decreasing environmental burdens, lead free solder has been used progressively in the relevant field. Correspondingly, improvement in heat resistance is demanded for wiring materials such as TAB (Tape Automated Bonding) tape, FPC (Flexible Printed Circuit), MFJ (Multi Frame Joiner), etc. An insulation layer for the wiring materials basically includes a substrate film and an adhesive layer. Such examples are shown in JP-A Hei 5 (1993)-29399, which describes heat resistant films, for example, of polyimide, polyether imide, polyphenylene sulfide, polyether ether ketone, etc. and organic insulation films comprising composite heat resistant films such as epoxy resin-glass cloth, epoxy resin-polyimide-glass cloth, etc. as the substrate film. It discloses an adhesive composition comprising a polyamide resin and an epoxy resin as the adhesive layer.

However, the adhesive composition of JP-A-Hei 5 (1993)-29399 involves a problem that a storage stability is low due to high reactivity between the amino group and the epoxy resin present in the polyamide resin structure. For overcoming the problem, JP-A-2004-136631 proposes an adhesive composition comprising a phenoxy resin having an epoxy group on both terminal ends, an acrylic rubber, and a curing agent. For the phenoxy resin, a bisphenol A type, a bisphenol F type, a bisphenol AD type, a bisphenol S type, and a copolymer type comprising bisphenol A and bisphenol F are exemplified. The adhesive composition of JP-A-2004-136631 involves problems that the adhesion strength is only about 0.5 kN/m although the phenoxy resin which is considered to have a relatively excellent adhesion strength is blended and that the soldering heat resistance is somewhat low as 260° C.

For overcoming the problems described above, JP-A-2010-150437 discloses an adhesive composition comprising a thermoplastic polyurethane resin having a weight-average molecular weight of 80,000 to 800,000, an epoxy resin, and an epoxy resin curing agent. While usual polyurethane resins involve a problem in the storage stability of an adhesive film due to high reactivity with an epoxy resin, the patent document describes that the storage stability can be improved by using a polyurethane resin having a molecular weight within a predetermined range. This resin composition has an adhesion strength of 1.1 to 1.7 kN/m. Further, JP-A-2010-143988 discloses that the soldering heat resistance of an adhesive composition comprising a polyurethane resin, an epoxy resin, and a novolac resin of a specific structure is 300° C. However, it has been generally known that polyurethane resins used in JP-A-2010-150437 and JP-A-2010-143988 are depolymerized at a temperature of 200° C. or higher. Since it is generally considered that the heat resistance of polyurethanes is 80 to 100° C., adhesives containing polyurethane resins involve concern about application use in the field of electronic equipment for industry and automobiles that require high heat resistance and high reliability. Further, the mechanism of suppressing the reaction with the epoxy resin by the molecular weight control of the polyurethane resin described in JP-A-2010-150437 is based on decrease in the concentration of functional groups but the reactivity per se is not changed, and no sufficient consideration has been taken for the effects of storing temperature or time.

JP-A-2009-67934 discloses a heat resistant self-fusing coating material containing a sulfonic group-containing polyhydroxy polyether resin and maleimide. However, the sulfonic group-containing polyhydroxy polyether resin described therein is different from a phenoxy resin having a bisphenol S skeleton used in the present invention. The problem of this heat resistant self-fusing coating material is that the fusing and curing temperature thereof is extremely high to issue a problem in view of processability.

The present invention intends to provide an adhesive composition excellent in storage stability, heat resistance, reliability, and adhesion property, and also capable of being adhered at low temperature, as well as an adhesive film and a wiring film using the adhesive composition.

SUMMARY OF THE INVENTION

The present invention provides an adhesive composition comprising 10 to 100 parts by weight of a maleimide compound having a plurality of maleimide groups in a structure and having a melting temperature and gelling time each within a predetermined range based on 100 parts by weight of a phenoxy resin having a bisphenol S skeleton in a structure, as well as an adhesive film and a wiring film using the adhesive composition.

The present invention can provide an adhesive film showing extremely high adhesion property, reliability, and high adhesion property upon adhesion at a low temperature in a short time and, further, provide a wiring film of high thermal reliability and mechanical reliability with the adhesive film.

DETAILED DESCRIPTION OF THE PREFERRED EMBODIMENTS

In the development of an adhesive composition excellent in the storage stability during storage and excellent in the heat resistance and the reliability after adhesion, the present inventors have selected a phenoxy resin having a 5% thermal weight loss temperature exceeding 350° C. as a base resin. Further, a polyimide film excellent in the heat resistance was adopted as the substrate of the adhesive film. An appropriate solvent should be selected for preparing an adhesive composition using a phenoxy resin, coating and drying the composition on a substrate film to form an adhesive layer. While good solvent for the phenoxy resin includes tetrahydrofurane (THF), cyclohexanone, etc., it was considered that the use of a high boiling solvent such as cyclohexanone is preferred since THF allowing easy drying at a low temperature may possibly cause explosion danger during manufacture. For drying an adhesive layer comprising an adhesive composition by using the high boiling solvent, drying at high temperature for long time is necessary.

Then, it is considered to be difficult to use a crosslinking ingredient such as isocyanate, block isocyanate, epoxy resin, cyanate ester resin, etc. that proceeds the curing reaction at a relatively low temperature and has been used so far as a preferred curing agent for the phenoxy resin. As a result of various studies, the present inventors have found that an adhesive composition comprising a phenoxy resin having a bisphenol S skeleton and a maleimide compound having a plurality of maleimide groups show a high adhesion property to a polyimide film or a conductor wiring even after a drying step at a relatively high temperature of 180° C., and the heat resistant and moisture resistant reliability at the adhesion boundary is sufficiently high. Further, the present inventors have found that an adhesive composition conforming to a low temperature process capable of being adhered at a temperature lower than 180° C. even after a drying step at 180° C. can be obtained by blending a first maleimide compound having a melting temperature of 160° C. or lower, and a gelling time at 200° C. of 180 to 350 seconds and/or a second maleimide compound having a gelling time at 250° C. of 110 to 150 seconds, among various maleimide compounds, and have accomplished the present invention.

Figure 1:
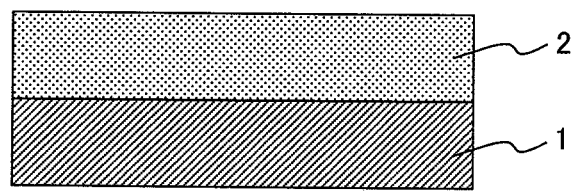
FIG. 1 is a schematic cross-sectional view of an adhesive film according to the invention.
Figure 2:
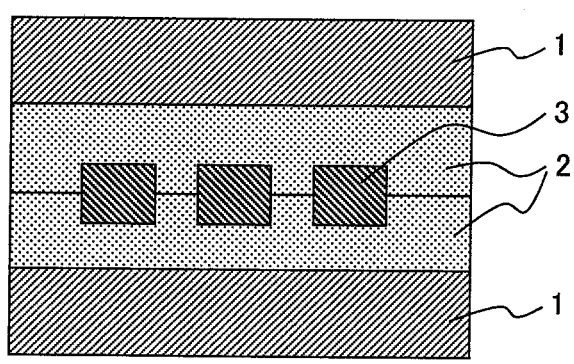
FIG. 2 is a schematic cross-sectional view of a wiring film according to the invention.

FIG. 1 shows a schematic cross-sectional view of an adhesive film according to the invention and FIG. 2 is a schematic cross-sectional view of a wiring film according to the invention.

Examples of preferred embodiments of the present invention are as described below.

(1) The phenoxy resin having the bisphenol S skeleton preferably has a structure of the following formula 1.

[Chem. 1]

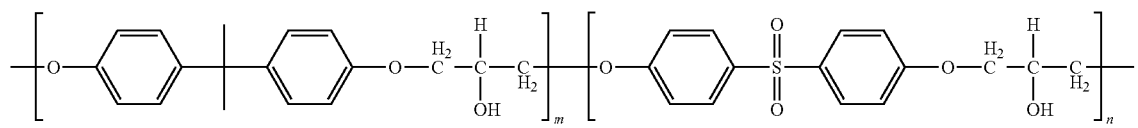

formula 1

The phenoxy resin preferably has a bisphenol A skeleton and a bisphenol S skeleton. A phenoxy resin of the structural formula where m and n each represent an integer, a n/m molar ratio is from 3/7 to 5/5 and a weight-average molecular weight based on a polystyrene conversion is 20000 to 60000 is preferred.

(2) Preferably, the maleimide compound comprises a first maleimide compound having a melting temperature of 160° C. or lower and a gelling time at 200° C. of 180 to 350 seconds and/or a second maleimide compound having a melting temperature of 160° C. or lower and a gelling time at 250° C. of 110 to 150 seconds.

(3) For the maleimide compound described above, the maleimide compounds represented by the following formulas 2 to 4 are preferred, and one or more of them is used.

[Chem. 2]

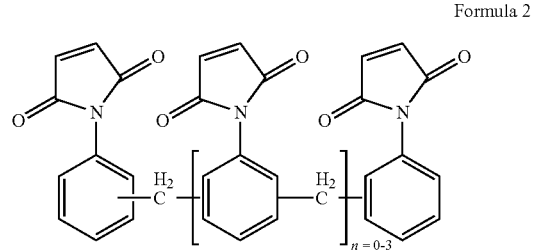

Formula 2

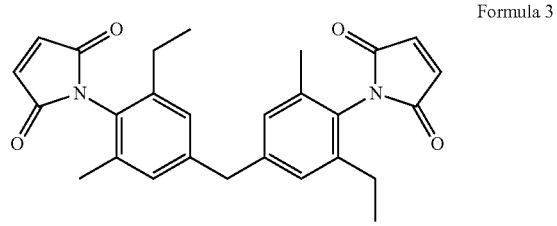

Formula 3

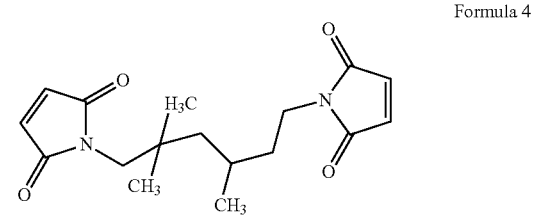

Formula 4

In the formula 2, n=0-3 means that at least one compound where n is 0 to 3 is contained.

(4) The present invention provides an adhesive film having, on a polyimide substrate, an adhesive layer comprising 10 to 100 parts by weight of a maleimide compound having a plurality of maleimide groups in a structure based on 100 parts by weight of a phenoxy resin having a bisphenol S skeleton in a structure.

(5) In the adhesive film, the phenoxy resin having the bisphenol S skeleton has the structure of the formula 1. Meanings of n in the formula and the weight-average molecular weight based on a polystyrene conversion are identical with those described above.

(6) An adhesive layer containing a maleimide compound having a melting temperature of 160° C. or lower and a gelling time at 200° C. of 180 to 350 seconds and/or a maleimide compound having a melting temperature of 160° C. or lower and a gelling time at 250° C. of 110 to 150 seconds is formed on a substrate film.

(7) An adhesive film in which the maleimide compound is one or more bismaleimide compounds represented by the formulas 2 to 4. n=0-3 in the formula 2 represents that at least one compound where n is 0 to 3 is contained.

(8) The present invention provides an adhesive film having an adhesion strength between a polyimide substrate and a cured product of an adhesive layer and between a conductor wiring and the cured product of the adhesive layer of 0.7 kN/m or more after fusion bonding an adhesive layer formed on a polyimide substrate and conductor wirings and curing the adhesive layer.

(9) In the heat resistant adhesive film, the fusion temperature upon fusion bonding is preferably 160° C. or lower.

(10) A wiring film is formed by disposing conductor wirings on an adhesive layer of a first adhesive film having an adhesive layer comprising 10 to 100 parts by weight of a maleimide compound having a plurality of maleimide groups in a structure based on 100 parts by weight of a phenoxy resin having a bisphenol S skeleton in a structure, stacking an adhesive layer surface of a second heat resistant adhesive film further on the conductor wirings, and fusion bonding the first adhesion film with the second adhesion film and the first and the second adhesive films with the conductor wirings.

(11) A wiring film in which the phenoxy resin having the bisphenol S skeleton has the structure of the formula 1.

(12) A wiring film comprising a first maleimide compound having a melting temperature of 160° C. or lower and a gelling time at 200° C. of 180 to 350 seconds and/or a second maleimide compound having a melting temperature of 160° C. or lower and a gelling time at 250° C. of 110 to 150 seconds.

(13) A wiring film in which the maleimide compound comprises one or more bismaleimide compounds represented by the formulae 2 to 4.

(14) In the wiring film, the adhesive layer is post-heated at or higher than the fusion bonding temperature thereof for increasing the adhesion strength between the conductor wirings and the adhesive film.

(15) In the wiring film, the conductor wiring is preferably a copper wiring.

(16) In the wiring film, at least a portion of the outer layer of the copper wirings is coated with a metal layer containing one of tin, nickel, zinc, and cobalt and a layer selected from the group consisting of an oxide layer formed by oxidizing the metal layer and a hydroxide layer of the metal layer to suppress oxidation of the copper wirings and improve the adhesion property.

(17) In the wiring film, at least a portion of the outer layer of the conductor wirings can be coated with a silane coupling agent containing one or more groups selected from the group consisting of amino group, vinyl group, styryl group, acrylate group, and methacrylate group.

Main functions of the phenoxy resin and the maleimide compound in the invention are to be described. The phenoxy resin is an ingredient mainly for the functions of providing the adhesive composition with film depositability and providing the adhesive layer after curing with soft and flexibility and mechanical strength. A preferred range of the molecular weight for developing such functions is from 20000 to 60000 weight-average molecular weight measured by a gel permeation chromatography (GPC) method (an polystyrene standard).

The content of the bisphenol S skeleton based on the total amount of the bisphenol S skeleton and other skeleton constituent, for example, a bisphenol A skeleton is preferably 30 to 50 mol %.

In the phenoxy resin, it is preferred that the n/m molar ratio of the phenoxy resin having the bisphenol S skeleton is from 3/7 to 5/5 and the weight-average molecular weight based on a polystyrene conversion is from 20000 to 60000. Such a phenoxy resin includes, for example, YX8100, manufactured by Japan Epoxy Resin Co., and YPS-007A30 manufactured by Toto Kasei Co.

The maleimide compound is an ingredient for providing the adhesive layer with melting fluidity and thermosetting property. This improves the fusion bonding property of the adhesive layer and improves the heat resistance, the moisture resistance, the adhesive property, and the chemical resistance of the adhesive layer after curing. Further, a maleimide compound having a melting temperature of 160° C. or lower and a gelling time at 200° C. of 180 to 350 seconds and/or a maleimide compound having a melting temperature of 160° C. or lower and a gelling time at 250° C. of 110 to 150 seconds are preferably selected as the maleimide compound since the fusion bonding property at a low temperature of 160° C. or lower, and the heat resistant and moisture resistant reliability are compatible.

Specific examples of the maleimide compound used preferably include, for example, BMI-2000, BMI-5000, BMI-5100, and BMI-TMH (manufactured by Daiwa Kasei Kogyo Co. Ltd.).

A preferred blending ratio of the phenoxy resin and the maleimide compound in the invention is in a range from 10 to 100 parts by weight of the maleimide compound based on 100 parts by weight of the phenoxy resin. When the ratio of the maleimide compound is extremely low, curing becomes insufficient to sometimes deteriorate the heat resistance, the moisture resistance, and the chemical resistance. When the ratio of the maleimide compound is excessively high, it may sometimes issue a problem of lowering the adhesion property and the adhesive layer becomes non-uniform due to deposition of the maleimide compound. Further, a high boiling solvent such as cyclohexanone is preferably selected for preparing the resin composition as a varnish with a view point of the safety of operation.

A polyimide film is used preferably for the substrate of the adhesive film in the invention with a view point of the heat resistance. While the thickness of the polyimide film is not particularly restricted, it is preferably within a range form 25 to 100 μm with a view point of the handleability and the film cost. Examples of such polyimide film include Kapton 100V, 200V, 100H, 200H (manufactured by DuPont Toray Co., Ltd.), Apical 25 NPI (manufactured by Kaneka Corp.).

The thickness of the adhesive layer formed on the substrate can be selected optionally in accordance with the thickness of the conductor. When the thickness of the conductor is 35 to 100 μm, the adhesive layer is formed preferably to 20 to 100 μm considering the filling ability of the wiring.

In the wiring film of the invention, the adhesion strength between the conductor wiring and the adhesion film can be increased by post-heating at or higher than melting temperature. Preferred post-heating conditions may be at 180° C. to 220° C. for 30 minutes to 60 minutes. Further, in the invention, copper wirings coated with a metal layer containing one of tin, nickel, zinc, and cobalt and/or a layer of oxide or hydroxide of the metal are used preferably as the conductor wirings. This can suppress oxidation at the surface of the copper to ensure stable adhesion property. A foreign metal layer can be formed to the copper surface by using a plating method.

Further, at the outermost surface of the conductor wirings of the invention, a silane coupling agent containing amino group, vinyl group, styryl group, acrylate, or methacrylate group can be disposed. At least a portion of the outer layer of the conductor wirings is preferably coated with the silane coupling agent containing an amino group, vinyl group, styryl group, acrylate group, or methacrylate group. Since the silane coupling agent forms a primary bonding with the maleimide compound, the silane coupling agent contributes to the improvement of the adhesion property, the heat resistance, and the moisture resistance of the wiring film. Specific example of the silane coupling agent includes commercially available silane coupling agents such as N-2-(aminoethyl)-3-aminopropylmethyl dimethoxy silane, N-2-(aminoethyl)-3-aminopropyl methyl trimethoxy silane, N-2-(aminoethyl)-3-aminopropyl methyl triethoxy silane, 3-amino propyl trimethoxy silane, 3-aminopropyl triethoxy silane, 3-ureido propyl trimethoxy silane, vinyl trimethoxy silane, vinyl triethoxy silane, 3-methacryloxy propyl methyl dimethoxy silane, 3-methacryloxy propyl trimethoxy silane, 3-acryloxy propyl trimethoxy silane, and p-styryl trimethoxy silane.

The surface treatment by the silane coupling agent is performed by coating a 0.5 to 8 wt % aqueous solution or alcoholic solution of a silane coupling agent and then drying the same at 100 to 150° C. for 10 to 30 minutes.

EXAMPLE

The present invention is to be described specifically with reference to examples and comparative examples. The resin compositional ratio of the adhesive and the solvent are shown in Table 1 on the weight basis.

Reagent and evaluation method are shown.

(1) Tested Samples

Maleimide compound 1: BMI-1000, manufactured by Daiwa Kasei Kogyo Co., melting temperature=147 to 168° C., gelling time at 200° C.=120 to 150 sec.

Maleimide compound 2: BMI-3000, manufactured by Daiwa Kasei Kogyo Co., melting temperature=199 to 204° C., gelling time at 250° C.=30 sec.

Maleimide compound 3: BMI-4000, manufactured by Daiwa Kasei Kogyo Co., melting temperature=134 to 163° C., gelling time at 250° C.=60 to 90 sec.

Maleimide compound 4: BMI-2000 (formula 2), manufactured by Daiwa Kasei Kogyo Co., melting temperature=125 to 160° C., gelling time at 200° C.=180 to 240 sec.

Maleimide compound 5: BMI-5000 (formula 3), manufactured by Daiwa Kasei Kogyo Co., melting temperature=130 to 154° C., gelling time at 250° C.=110 sec.

Maleimide compound 6: VPMI, 4-vinyl phenyl maleimide, melting temperature=110 to 120° C., gelling time at 200° C.<5 sec.

Maleimide compound 7: BMI-TMH (formula 4), manufactured by Daiwa Kasei Kogyo Co., melting temperature=73 to 110° C., gelling time at 250° C.=126 sec.

Sulfonic group-containing phenoxy resin: YPS-007A30, manufactured by Toto Kasei Co.

Polyimide film 1: Kapton (registered trademark) 100V, manufactured by DuPont Toray Co.

Polyimide film 2: Apical (registered trademark) 25NPI, manufactured by Kaneka Co.

Copper foil 1: copper foil of 100 μm thickness has a tin plating layer at 100 nm thickness on the surface, and tin hydroxide or tin oxide is present on the surface of the tin plating layer. The surface roughness (Ra) was 0.2 μm.

Copper foil 2: copper foil applied at the surface of the copper foil 1 with an aminosilane treatment. Amino silane treating condition: the copper foil 1 was dipped for one minute to a 5% aqueous solution of N-β(aminoethyl)-γ-aminopropyl trimethoxysilane and then taken out. It was dried at 120° C. for 30 minutes to form an amino silane layer on the surface.

(2) Preparation of Adhesive Varnish

Adhesive varnishes were prepared at predetermined ratios described in Table 1.

(3) Manufacture of Adhesive Film

An adhesive varnish was coated on a polyimide film substrate by using a bar coater having a predetermined gap, and dried at 180° C. for 30 minutes to manufacture an adhesive film. The thickness of the adhesive layer was adjusted to 30 μm.

(4) Evaluation for Adhesion Strength Between Substrate and Adhesion Layer

Two sheets of adhesive films were adhered at the side of the adhesive layers to each other, heated and pressed under the conditions at 160° C. and 0.4 MPa for 10 minutes to bond them. Further, they were post-heated in an atmospheric air with no pressure at 180° C. for 30 minutes. Sample films just after the bonding and after the post-heating were cut out each into 1 cm square and a 180° peel test was performed between the substrate and the adhesive layer.

(5) Evaluation for Adhesion Strength Between Copper Foil and Adhesive Layer

A tin plated copper foil was placed to the surface of the adhesive film at the side of the adhesive layer and adhered by heating under pressure for 10 minutes under the conditions at 160° C. and 0.4 MPa. Further, they were post-heated in atmospheric air with no pressure at 180° C. for 30 minutes. A peel test was performed in the same manner as in (4) to the sample after the post-heating.

(6) Heat Resistance and Moisture Resistance Test

A tin plated copper foil was placed to the surface of the adhesive film at the side of the adhesive layer and adhered by heating under pressure for 10 minutes under the conditions at 160° C. and 0.4 MPa. Further, they were post-heated in atmospheric air with no pressure at 180° C. for 30 minutes. Then, they were exposed to saturated steams at 121° C. and 2 atm for 24 hours. A peel test was performed in the same manner as in (5).

(7) Soldering Heat Resistance Test

A tin plated copper foil was placed to the surface of the adhesive film at the side of the adhesive layer and adhered by heating under pressure for 10 minutes under the conditions at 160° C. and 0.4 MPa. Further, they were post-heated in atmospheric air with no pressure at 180° C. for 30 minutes. This sample was floated in a soldering bath at 280° C. and kept for one minute. In visual inspection, samples with no occurrence of swelling were indicated by "○" and samples with occurrence of swelling were indicated by "×". Further, for the samples after the soldering test, a peel test was performed in the same manner as in (5).

Comparative Example 1

The composition of the adhesive of Comparative Example 1 is described in Table 1. Comparative Example 1 is an adhesive not containing a maleimide compound. Table 2 shows the adhesion strength with a polyimide film 1 (Kapton 100V) at an adhesion temperature of 160° C. The adhesion strength of the adhesive film of Comparative Example 1 showed a low value as 0.5 kN/m. Using this adhesion film, the effect of the post-heating, the adhesion property with the copper foil, and the soldering heat resistance were investigated. The result is shown in Table 3. The effect of improving the adhesion strength by the post-heating was low and the adhesion strength with the copper foil showed a low value as 0.5 to 0.6 kN/m. Further, swelling occurred in the soldering heat resistance test. It was found that the adhesion strength and the heat resistance of the adhesive film not containing the maleimide compound were low.

Comparative Example 2

The composition of the adhesive of Comparative Example 2 is described in Table 1. The maleimide compound used in Comparative Example 2 is a compound having a maleimide group and a styrene group each by one, which is 4-vinyl phenyl maleimide (VPMI) having a melting temperature of 110 to 120° C. and a gelling time at 200° C. of less than 5 sec. Table 2 shows the adhesion strength with the polyimide film 1 (Kapton 100V) at an adhesion temperature of 160° C. The adhesion strength of the adhesive film of Comparative Example 2 showed a low value as 0.3 kN/m. It is considered that the curing reaction proceeded excessively in the drying step due to the extremely short gelling time of VPMI to show a low adhesion property.

Comparative Example 3

The composition of the adhesive of Comparative Example 3 is described in Table 1. The maleimide compound used in Comparative Example 3 is 4,4'-diphenyl methane bismaleimide (BMI-1000) having a melting temperature of 147 to 168° C. and a gelling time at 200° C. of 120 to 150 seconds. Table 2 shows the adhesion strength with the polyimide film 1 (Kapton 100 V) at an adhesion temperature of 160° C. The adhesion strength showed a low value as 0.4 kN/m. It is considered that the adhesion strength is low since the BMI-1000 has a somewhat high melting temperature and also a somewhat short gelling time at 200° C.

Comparative Example 4

The composition of the adhesive of Comparative Example 4 is described in Table 1. The maleimide compound used in Comparative Example 4 is bisphenol A diphenyl ether bismaleimide (BMI-4000) having a melting temperature of 134 to 163° C., and a gelling time at 250° C. of 60 to 90 seconds. Table 2 shows the adhesion strength with the polyimide film 1 (Kapton 100 V) at an adhesion temperature of 160° C. The adhesion strength showed a low value as 0.3 kN/m. It is considered that the adhesion strength is low since BMI-4000 has a somewhat high melting temperature and a somewhat short gelling time.

Comparative Example 5

The composition of the adhesive of Comparative Example 5 is described in Table 1. The maleimide compound used in Comparative Example 5 is m-phenylene bismaleimide (BMI-3000) having a melting temperature of 199 to 204° C. and a gelling time at 250° C. of 30 seconds. Since BMI-3000 has a high melting temperature and also has a short gelling time at 250° C., the adhesion strength showed a low value as 0.2 kN/m after bonding at 160° C.

TABLE 1

| Sample name | Comp. Example 1 | Comp. Example 2 | Comp. Example 3 | Comp. Example 4 | Comp. Example 5 | Example 1 | Example 2 | Example 3 |
| --- | --- | --- | --- | --- | --- | --- | --- | --- |
| YPS-007A30 | 2.0 | 1.7 | 1.7 | 1.7 | 1.7 | 1.7 | 1.7 | 1.7 |
| VPMI | | 0.3 | | | | | | |
| BMI-1000 | | | 0.3 | | | | | |
| BMI-4000 | | | | 0.3 | | | | |
| BMI-3000 | | | | | 0.3 | | | |
| BMI-2000 | | | | | | 0.3 | | |
| BMI-5000 | | | | | | | 0.3 | |
| BMI-TMH | | | | | | | | 0.3 |
| Cyclohexanone | 6 | 6 | 6 | 6 | 6 | 6 | 6 | 6 |

TABLE 2

| | | Comp. Example 1 | Comp. Example 2 | Comp. Example 3 | Comp. Example 4 | Comp. Example 5 | Example 1 | Example 2 | Example 3 |
| --- | --- | --- | --- | --- | --- | --- | --- | --- | --- |
| Adhesion strength between adhesive film and polyimide film 1 used as a substrate (kN/m) | Adhesion temperature 160° C. | 0.5 | 0.3 | 0.4 | 0.3 | 0.2 | 0.7 | 0.7 | 0.7 |

Example 1

The composition of the adhesive of Example 1 is described in Table 1. The maleimide compound used in Example 1 is polyphenyl methane maleimide (BMI-2000) having a melting temperature of 125 to 160° C. and a gelling time at 200° C. of 180 to 240 seconds. Table 2 shows the adhesion strength with the polyimide film 1 (Kapton 100V) at an adhesion temperature of 160° C. The adhesion strength showed a relatively high value as 0.7 kN/m. Using this adhesive film, the effect of the post-heating, the adhesion property with a copper foil, and the soldering heat resistance were investigated. The result is shown in Table 3. The adhesion strength between the films was improved to 1.4 kN/m by the post-heating at 180° C. The adhesion strength with the copper foil and the soldering heat resistance were also excellent. It was found that an adhesive film having compatible low temperature adhesion property and high heat resistance could be obtained by using the maleimide compound having the melting temperature and the gelling time each in a predetermined range. Therefore, it

Example 3

The composition of the adhesive of Example 3 is described in Table 1. The maleimide compound used in Example 3 is 1,6-bismaleimide(2,2,4-trimethyl)hexane (BMI-TMH) having a melting temperature of 73 to 110° C. and a gelling time at 250° C. of 126 seconds. Table 2 shows the adhesion strength with the polyimide film 1 (Kapton 100V). The adhesion strength showed a relatively high value as 0.7 kN/m. Using this adhesive film, the effect of the post-heating, the adhesion property with the copper foil, and the soldering heat resistance were investigated. The result is shown in Table 3. The adhesion strength between the films was improved to 1.2 kN/m by the post-heating at 180° C.

The adhesion strength with the copper foil and the soldering heat resistance were also excellent. It was found that an adhesive film having compatible low temperature adhesion property and high heat resistance could be obtained by using the maleimide compound having a melting temperature and a gelling time each in a predetermined range. Therefore, it was found that the adhesive composition and the adhesive film are suitable as materials for the wiring film requiring heat resistance.

TABLE 3

|  |  | Comp. Example 1 | Example 1 | Example 2 | Example 3 |
| --- | --- | --- | --- | --- | --- |
| Adhesion strength between adhesive film and polyimide film 1 used as a substrate (kN/m) | Adhesion temperature 160° C. + 180° C. post-heating | 0.6 | 1.4 | 1.3 | 1.2 |
| Adhesion strength between adhesive film using polyimide film 1 as a substrate and copper foil 1 (kN/m) | Adhesion temperature 160° C. + 180° C. post-heating | 0.5 | 1.2 | 1.1 | 1.0 |
| Adhesion strength between adhesive film using polyimide film 1 as a substrate and copper foil 2 (kN/m) | Adhesion temperature 160° C. + 180° C. post-heating | 0.6 | 1.4 | 1.3 | 1.1 |
|  | After 280° C. solder test | 0.6 | 1.4 | 1.3 | 1.0 |
| Visual inspection after solder test | Presence or absence of swelling | x | ○ | ○ | ○ | was found that the adhesive composition and the adhesive film are suitable as the materials for the wiring film requiring heat resistance.

Example 2

The composition of the adhesive of Example 2 is described in Table 1. The maleimide compound used in Example 2 is 3,3'-dimethyl-5,5'-diethyl-4,4'-diphenyl methane bismaleimide (BMI-5000) having a melting temperature of 130 to 154° C. and a gelling time at 250° C. of 110 seconds. Table 2 shows the adhesion strength with the polyimide film 1 (Kapton 100V) at an adhesion temperature of 160° C. The adhesion strength showed a relatively high value as 0.7 kN/m. Using this adhesive film, the effect of the post-heating and the adhesion property with the copper foil and the soldering heat resistance were investigated. The result is shown in Table 3. The adhesion strength between the films was improved to 1.3 kN/m by the post-heating at 180° C. The adhesion strength with the copper foil and the soldering heat resistance were also excellent. It was found that an adhesive film having compatible low temperature adhesion property and high heat resistance could be obtained by using the maleimide compound having the melting temperature and the gelling time each in a predetermined range. Therefore, it was found that the adhesive composition and the adhesive film are suitable as materials for the wiring film requiring heat resistance.

Example 4

The adhesive of Example 1 was coated on a polyimide film 2 (Apical 25 NPI) to manufacture the adhesive film of Example 4. The adhesion strength between the adhesive film and the copper foil 2 and the adhesion strength after heat resistance and moisture resistance test are described in Table 4. It was confirmed that the adhesion strength between this adhesion film and the copper foil was as high as 1.3 to 1.4 kN/m, which was scarcely lowered and after the heat resistance and moisture resistance test, and the heat resistance and moisture resistance were excellent. In view of the above, a result was obtained that the wiring film manufactured by using the adhesive composition and the adhesive film was excellent in the heat resistant and moisture resistant reliability.

Example 5

The adhesive of Example 2 was coated on the polyimide film 2 (Apical 25 NPI) to manufacture an adhesive film of Example 5. The adhesion strength between the adhesive film and the copper foil 2 and the adhesion strength after the heat resistance and moisture resistance test are described in Table 4. It was confirmed that the adhesion strength of this adhesive film and the copper foil was scarcely lowered and the heat resistant and moisture resistant reliability were excellent. In view of the above, a result was obtained that the wiring film manufactured by using the adhesive composition and the adhesive film was excellent in the heat resistant and moisture resistant reliability.

Example 6

The adhesive of Example 3 was coated on the polyimide film 2 (Apical 25 NPI) to manufacture an adhesive film of Example 6. The adhesion strength between the adhesive film and the copper foil 2 and the adhesion strength after the heat resistance and moisture resistance test are described in Table 4. It was confirmed that the adhesion strength of this adhesive film and the copper foil was scarcely lowered and the heat resistant and moisture resistant reliability were excellent. In view of the above, a result was obtained that the wiring film manufactured by using the adhesive composition and the adhesive film was excellent in the heat resistant and moisture resistant reliability.

TABLE 4

| | | Example 4 | Example 5 | Example 6 |
|---|---|---|---|---|
| Adhesion strength between adhesive film using polyimide film 2 as a substrate and copper foil 2 (kN/m) | Adhesion temperature 160° C. + 180° C. post-heating | 1.4 | 1.3 | 1.1 |
| | After heat resistance and moisture resistance test | 1.3 | 1.2 | 1.0 |

Examples 7 to 9

Examples 7 to 9 are examples of adhesive compositions in which the blending amount of the maleimide resin (BMI-5000) was varied to 10 to 100 parts by weight based on 100 parts by weight of a phenoxy resin having a bisphenol S skeleton. The compositions are shown in Table 5. Within the range of this investigation, deposition of the resin ingredient in the varnish was not observed and good storage stability was confirmed. Characteristics of the adhesive films using the adhesive compositions of Examples 7 to 9 are shown in Table 6. Within the range of the adhesive compositions, it was confirmed that the adhesion strength between the adhesive film and the copper foil showed high values and the heat resistance and moisture resistance were also excellent.

TABLE 5

| Sample name | Example 7 | Example 8 | Example 9 |
|---|---|---|---|
| YPS-007A30 | 1.8 | 1.5 | 1.0 |
| BMI-5000 | 0.18 | 0.5 | 1.0 |
| Cyclohexanone | 6 | 6 | 6 |

TABLE 6

| | | Example 7 | Example 8 | Example 9 |
|---|---|---|---|---|
| Adhesion strength between adhesive film using polyimide film 2 as a substrate and copper foil 2 (kN/m) | Adhesion temperature 160° C. + 180° C. post-heating | 1.1 | 1.4 | 1.0 |
| | After heat resistance and moisture resistance test | 1.0 | 1.3 | 0.9 |

Example 10

A pseudo wiring film was manufactured by using the adhesive film of Example 4. The steps are shown below.

(1) Rectangular copper wires (each 300 μm width, 35 μm thickness) were placed by the number of 10 each at 1 mm distance on the surface of the adhesive layer of the adhesive film cut out into 10 cm×2 cm size.

(2) An adhesive film cut out to 9 cm×2 cm was prepared separately, and disposed on the above-mentioned copper wirings with the direction of the longitudinal axis being aligned and in contact with the surface of the adhesive layer.

(3) The laminate described above was put between polyethylene terephthalate films subjected to a releasing treatment and pressed under the conditions at 160° C. for 10 minutes under 0.4 MPa to join the copper wirings by heat fusion bonding between the mating adhesive films.

The laminate was taken out of the polyethylene terephthalate films and post-heated at 180° C. for 30 minutes to manufacture a pseudo wiring film. This sample did not cause cracking or peeling even after a high temperature and high humidity test and a soldering heat resistance test and a result was obtained, which was considered to be favorable as the heat resistant wiring film.

The heat resistant adhesive film of the invention is suitable as an insulation adhesive sheet, for example, TAB tape, FPC, FFC, and MFJ. Further, the wiring film of the invention is excellent in the heat resistance and suitable to wiring materials for automobiles, and electronic and electric equipment.

What is claimed is:

1. An adhesive composition comprising a phenoxy resin having a bisphenol S skeleton in a structure and 10 to 100 parts by weight of a maleimide compound based on 100 parts by weight of the phenoxy resin, wherein the maleimide compound has a plurality of maleimide groups in a structure and is at least one member selected from the group consisting of a first maleimide compound having a melting temperature of 160° C. or lower and a gelling time at 200° C. of 180 to 350 seconds and a second maleimide compound having a melting temperature of 160° C. or lower and a gelling time at 250° C. of 110 to 150 seconds.

2. The adhesive composition according to claim 1, wherein the phenoxy resin having the bisphenol S skeleton has the structure of the following formula 1:

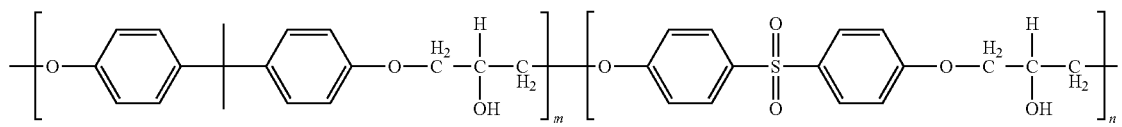

formula 1

(where m and n in the formula 1 each represent an integer).

3. The adhesive composition according to claim 2, wherein the n/m molar ratio of the phenoxy resin having the bisphenol S skeleton is 3/7 to 5/5 and the weight-average molecular weight based on a polystyrene conversion is from 20000 to 60000.

4. The adhesive composition according claim 1, wherein the maleimide compound comprises at least one member selected from the group consisting of compounds represented by the following formulae 2 to 4

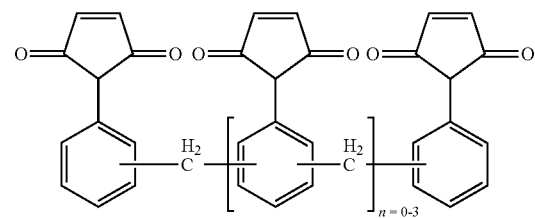

Formula 2

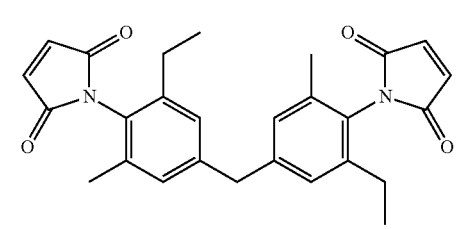

Formula 3

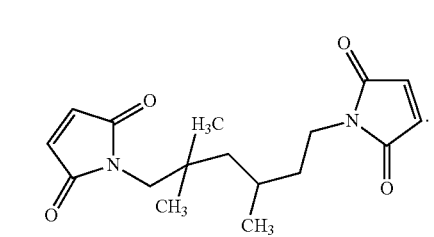

Formula 4

5. An adhesive film comprising an adhesive layer formed on a substrate made of a polyimide, the adhesive layer comprising a phenoxy resin having a bisphenol S skeleton in a structure and 10 to 100 parts by weight of a maleimide compound based on 100 parts by weight of the phenoxy resin, the maleimide compound having a plurality of maleimide groups in the structure being at least one member selected from the group consisting of a first maleimide compound having a melting temperature of 160° C. or lower and a gelling time at 200° C. of 180 to 350 seconds and a second maleimide compound having a melting temperature of 160° C. or lower and a gelling time at 250° C. of 110 to 150 seconds.

6. The adhesive film according to claim 5, wherein the phenoxy resin having the bisphenol S skeleton has the structure of the following formula 1:

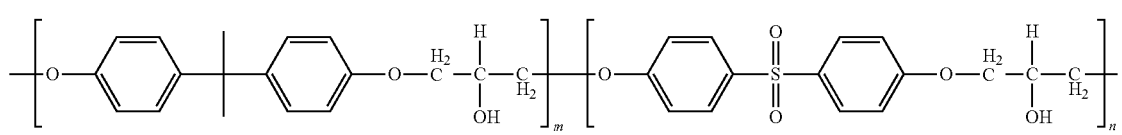

formula 1

(where m and n in the formula 1 each represent an integer).

7. The adhesive film according to claim 6, wherein the n/m molar ratio of the phenoxy resin having the bisphenol S skeleton is 3/7 to 5/5 and the weight-average molecular weight based on a polystyrene conversion is from 20000 to 60000.

8. The adhesive film according to claim 5, wherein the maleimide compound comprises at least one member selected from the group consisting of compounds represented by the following formulae 2 to 4

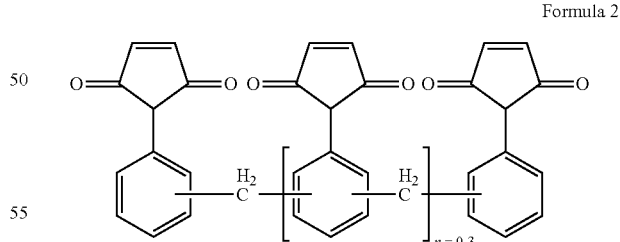

Formula 2

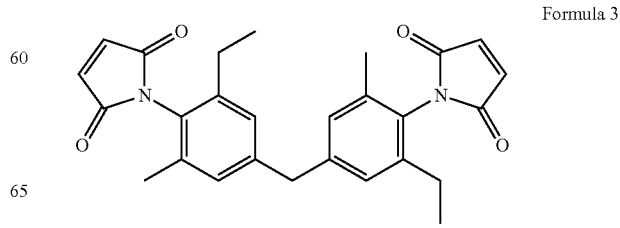

Formula 3

-continued

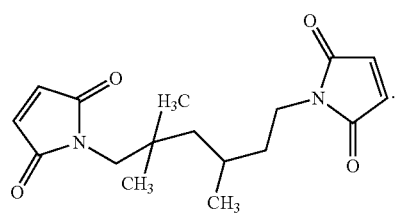

Formula 4

9. The adhesive film according to claim 5, wherein the adhesive layer and conductor wirings are disposed on the substrate, the adhesive layer and conductor wirings are fusion bonded, and an adhesion strength between the substrate and a cured product of the adhesive layer and between the conductor wirings and a cured product of the adhesive layer after curing the adhesive layer is 0.7 kN/m or more.

10. The adhesive film according to claim 9, wherein
the fusion bonding temperature upon fusion bonding is 160° C. or lower.

11. A wiring film comprising conductor wirings disposed on an adhesive layer of a first adhesive film on a substrate made of a polyimide, the adhesive layer of the first adhesive film comprising a phenoxy resin having a bisphenol S skeleton in a structure and 10 to 100 parts by weight of a maleimide compound based on 100 parts by weight of the phenoxy resin in which the maleimide compound has a plurality of maleimide groups in a structure and is at least one member selected from the group consisting of a first maleimide compound having a melting temperature of 160° C. or lower and a gelling time at 200° C. of 180 to 350 seconds and a second maleimide compound having a melting temperature of 160° C. or lower and a gelling time at 250° C. of 110 to 150 seconds, and an adhesive layer of a second adhesive film further stacked on the conductor wirings, the first and the second adhesive films being fusion bonded to each other, and the first adhesive film and the second adhesive film being fusion bonded with the conductor wirings.

12. The wiring film according to claim 11, wherein
the phenoxy resin having the bisphenol S skeleton has the structure of the following formula 1:

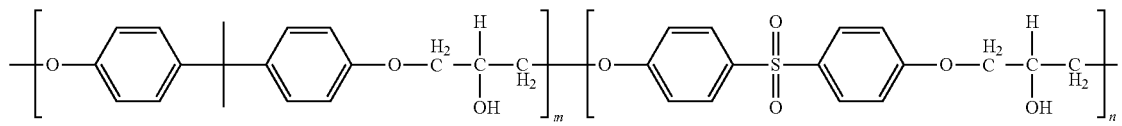

formula 1

(where m and n in the formula 1 each represent an integer).

13. The wiring film according to claim 12, wherein
the n/m molar ratio of the phenoxy resin having the bisphenol S skeleton is 3/7 to 5/5 and the weight-average molecular weight based on a polystyrene conversion is from 20000 to 60000.

14. The wiring film according to claim 11, wherein
the maleimide compound comprises at least one member selected from the group consisting of compounds represented by the following formulae 2 to 4

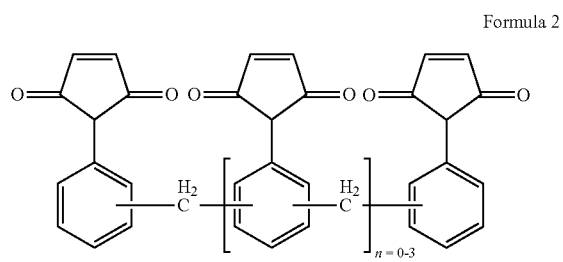

Formula 2

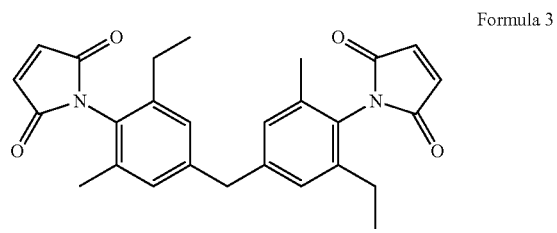

Formula 3

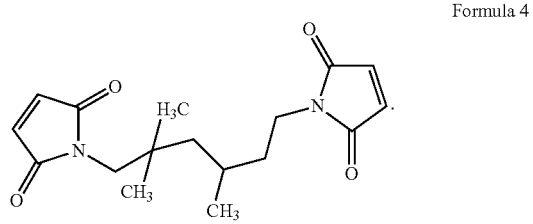

Formula 4

15. The wiring film according to claim 11, wherein
post-heating is performed at or higher than the fusion bonding temperature upon fusion bonding.

16. The wiring film according to claim 11, wherein
the conductor wirings are copper wirings.

17. The wiring film according to claim 16, wherein at least a portion of the outer layer of the copper wirings is coated with a metal film containing one of tin, nickel, zinc, and cobalt and a layer selected from the group consisting of an oxide of the metals and a layer of hydroxide of the metals.

18. The wiring film according to claim 11, wherein
at least a portion of the outer layer of the conductor wirings is coated with a silane coupling agent containing amino group, vinyl group, styryl group, acrylate group, or methacrylate group.

* * * * *